(No Model.) 2 Sheets—Sheet 1.
T. ROGERS.
LAWN MOWER.
No. 328,145. Patented Oct. 13, 1885.
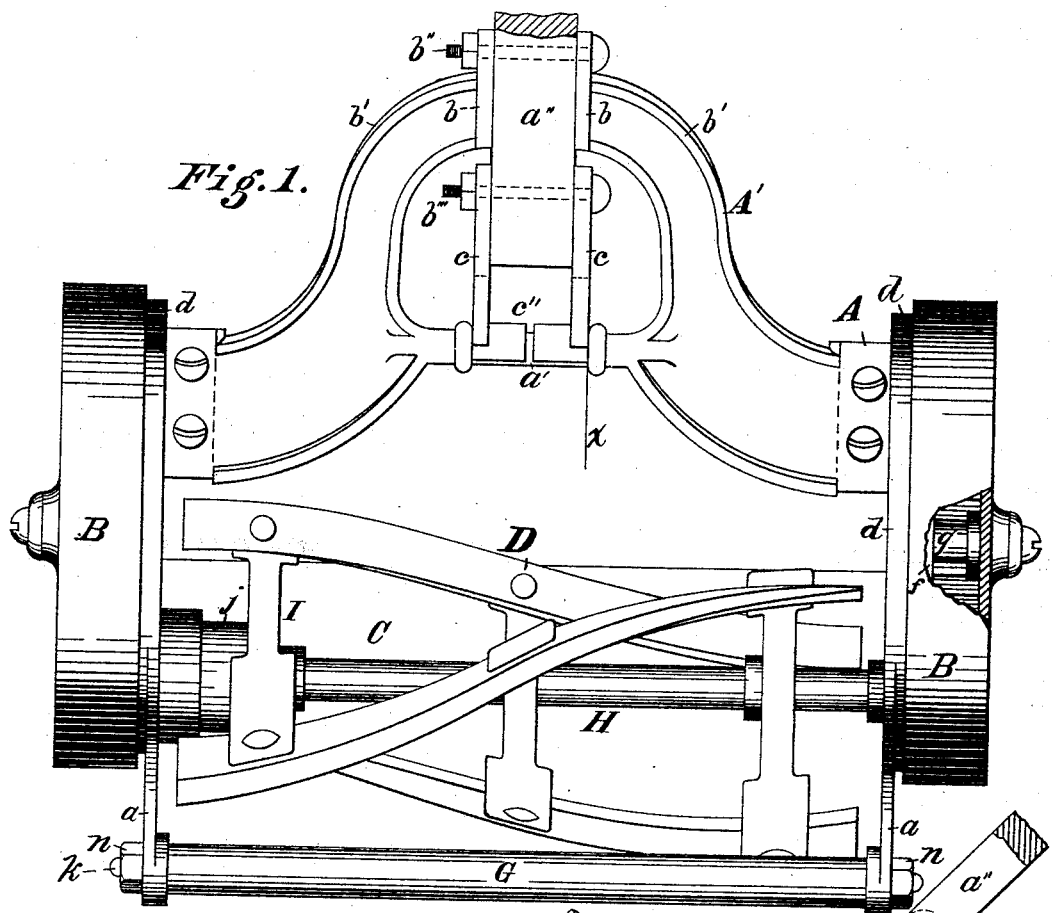
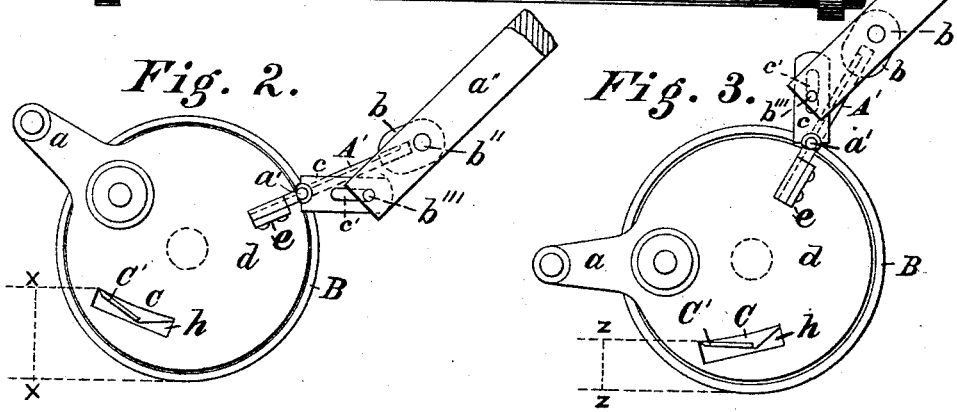
Attest
Collin Ford Jr
W. E. Cook
Inventor
Timothy Rogers
B. E. Converse
Atty.

(No Model.) 2 Sheets—Sheet 2.

T. ROGERS.
LAWN MOWER.

No. 328,145. Patented Oct. 13, 1885.

Attest
Collin Ford Jr.
W. E. Cook

Inventor
Timothy Rogers
B. C. Converse,
Atty.

UNITED STATES PATENT OFFICE.

TIMOTHY ROGERS, OF SPRINGFIELD, OHIO, ASSIGNOR, BY MESNE ASSIGNMENTS, TO THE ROGERS FENCE COMPANY, OF SAME PLACE.

LAWN-MOWER.

SPECIFICATION forming part of Letters Patent No. 328,145, dated October 13, 1885.

Application filed August 6, 1884. Serial No. 139,802. (No model.)

*To all whom it may concern:*

Be it known that I, TIMOTHY ROGERS, a citizen of the United States, residing at Springfield, in the county of Clark and State of Ohio, have invented certain new and useful Improvements in Lawn-Mowers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in lawn-mowers.

My invention relates to that class of lawn-mowers in which a series of rotary knives are operated; and it consists in the construction of the frame, in the attachment of the cutter-bar, and the adjustment of the latter; also in the means for adjusting the height of the cut.

Figure 5:
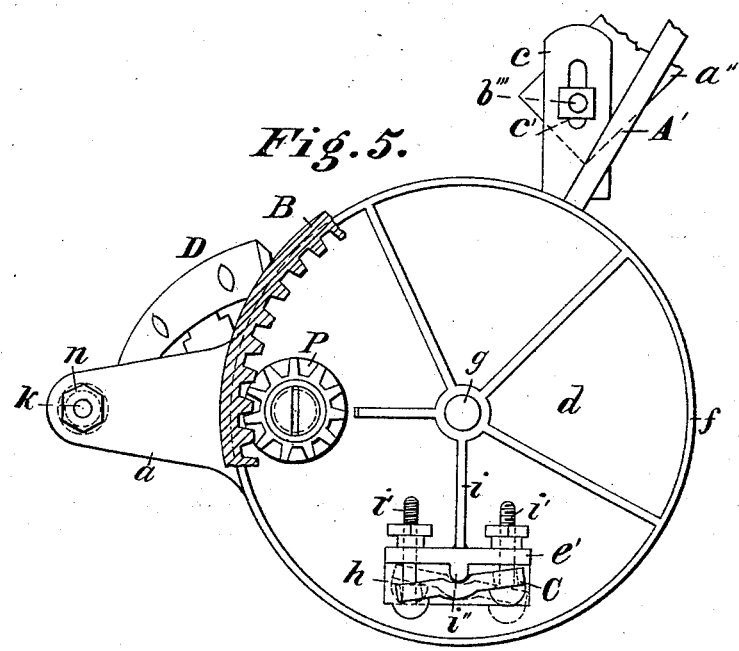
Figure 6:
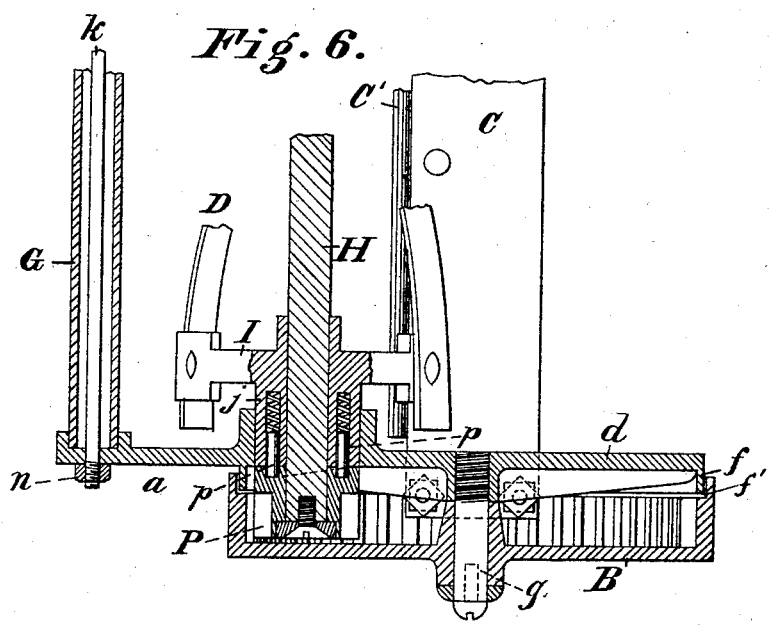

Figure 1 is a plan view of a lawn-mower having my improvements embodied therein. Fig. 2 is a section through line $x$, Fig. 1, with the reel-shaft removed, showing the adjustment of the machine for a high cut. Fig. 3 is the same section, showing the adjustment of the machine for a low cut. Fig. 4 is a detail. Fig. 5 is an end view of the frame with a partial section of the ground-wheel. Fig. 6 is a longitudinal section of the machine on a horizontal plane.

In the drawings, A is the frame, which is constructed in parts. Its ends $d$ are disk-shaped, with an arm, $a$, extending forward from each. These are connected at their extreme ends by a piece of gas-pipe, the ends of which are held in fixed collars on the arms, and a rod, $k$, extends through the pipe with threaded ends, and a nut is placed on each end of the rod outside of either arm, securing this part of the frame together, and forming a guard-bar, G, in front of the knife-reel D, in substantially the same plane with the shaft H of the latter. This guard-bar adds greatly to the strength of the machine and prevents the frame from getting out of line. The disks are formed with radial ribs on the outside to strengthen them. One of these ribs, $i$, extends downward to and is connected with the lug $e'$, to which the cutter-bar is attached.

It will be noticed that the cutter-bar ends, instead of being attached on the inside of the disk $d$, as in the ordinary construction, are attached on the outside of the latter. The object in this is to allow of a longer knife-reel. The projection of the lug (to which the cutter-bar is attached) on the inside of the disk prevents this. I therefore have the advantage of a rotary cutter about two inches to two and a half inches longer than in machines of the same length between the ground-wheels. The cutter-bar C has its ends extending through the openings $h$ in the disks, this opening being large enough to allow it to be tilted on the rib $i''$ on the under side of the lug $e'$, as seen in Fig. 5, in adjusting the knife C'. Screw-bolts $i'$ $i'$ extend through the cutter-bar and lug, one on each side of the rib $i$, and have jam-nuts on their ends, by which the bar and its knife are adjusted. In the ordinary construction a screw-bolt is used on one side and a set-screw on the other. I prefer this construction, as the adjustment is much better retained by the two bolts with their jam-nuts.

The knife-reel D is pivoted in the disks at each end, forward of the center of the ground-wheels, in substantially the same horizontal plane with the spindles $g$ of the latter, and the guard-bar intermediate of the spindles and the latter. The journal $j$, upon which the knife-reel turns on the pinion end, is enlarged, as seen in Fig. 6, to give room outside of the shaft for boring the holes for the two pin-pawls $p$ $p$ and their actuating-springs, which engage the pinion P on the side of the same on the end of the knife-reel shaft H, as seen in Fig. 6. The journal $j$, in which the pins $p$ $p$ are contained, is formed in a single piece with the spider I, as seen in this view. The dotted line across the end of the reel-shaft connecting the two pins $p$ $p$ shows the track of the latter on the side of the pinion. As the construction of this form of a pin-clutch is not new, it is necessary to describe it. The pinion P engages with the teeth of the internal gear in the rim of wheels B, as seen in Fig. 5. This gear is the ordinary internal-toothed form; but it does not extend entirely across the inner face of the wheel, a space of about one-third the width of the wheel-rim inside being turned out to form the peripheral recess $f'$, to admit the flange $f$ of the disk, which extends at right angles to the latter into the wheel. The object of this is to prevent grass when cut from entering the cavity of the wheel and obstructing the gear. Ribs, five in number, are formed on the outside of the disk extending radially from its hub to give it strength.

That part of the frame in which the adjustment is made is embraced in the A-shaped hounds A', to which the push-bar or tongue $a''$ is attached. A space is left between the two sides $b'b'$ in the center for the tongue-bar, which latter is clamped between the ears $b\ b$ at the extreme rear ends of $b'\ b'$ by the bolt $b''$ and nut. The front end of the tongue-bar extends forward of this bolt into the opening in the hounds, and is clamped between the two sections $c\ c$ of a clip-iron. These sections are flat pieces of malleable iron, each provided with a longitudinal slot, $c'$, through which the horizontal clamp-bolt $b'''$ extends, and they are made adjustable on the latter with the tongue-bar $a''$. The forward ends of the clip-iron sections are provided with sleeves, which are swiveled upon a round bar, $a'$, connecting the two sides of the A-shaped hounds. This bar is cast in one piece with the hounds. The edges of sleeve $c''$ are cast thin, as seen in the view, Fig. 4, and extend over the bar far enough to allow them to meet together, or nearly so, when bent down, as seen in the figure. The dotted lines show the normal position of the sleeve-edges, the bar $a'$ being shown in cross-section.

The outer ends of the hound-bar A' are bolted to lateral flanges $e$, of which there is one on each of the disks $d$, as seen in the two sectional views, Figs. 2 and 3. The spindles $g$ extend from the disk-centers through the wheel-hubs, and are secured by any ordinary means thereon.

In adjusting the mower reference may be had to Figs. 2 and 3. In making this adjustment the handle or tongue-bar $a''$ remains at the same angle to the ground, which is about forty-five degrees. In Fig. 2 the machine is shown as adjusted for making a high cut, and in Fig. 3 as adjusted for making a low cut. In changing the adjustment from that shown in the latter figure to that seen in the former, or from a low to a high cut, the bolts $b'''$ and $b''$ are first loosened and the frame partially rotated backward on the wheel-spindles $g$. By this movement the knife-reel D is elevated and the stationary knife C' correspondingly so from the plane of Z, Fig. 3, to that of X, Fig. 2, it being about twice the height of the former. These points form limits of adjustment. In the movement referred to the rear end of the clip-iron or link $c$ (which latter is perpendicular in Fig. 3) is thrown downward below the plane of the frame A', the link assuming a horizontal position, as seen in Fig. 2, its rear end being thrown from above the plane of the frame below it, and at the same time the hound-bar A' is changed from an angle of about sixty degrees to an angle of about twenty-five degrees. The adjustment does not affect the position of the tongue-bar $a''$, as will be seen by the figures. This adjustment from low to high cut, or vice versa, is easily and quickly made, after which the bolts $b''$ and $b'''$ are again tightened and the parts retained in adjustment. It will be understood that in the adjustment from high to low cut the frame is partially rotated forward, or in the opposite direction from that already explained. The longitudinal slots $c'$ in the clip-irons or link-sections $c$ allow the latter to slide on the bolt $b'''$ in conforming their movement to the required adjustment.

As the guard-bar G is in substantially the same horizontal plane with the shaft of the knife-reel, and held by arms $a$ in advance of it, there is no liability of injuring the knives in advancing the machine toward any obstacle. The frame is not only strengthened by this bar, but the latter permits the adjustment of the frame by means of its end connections in tightening up and retaining it true and in line.

The hole in the arms $a$, through which the rod $k$ extends in the middle of the collars, is only large enough for the rod, allowing the ends of the gas-pipe to abut against the plate inside the collars.

I claim as my invention—

1. In a lawn-mower, the combination of the ground-wheels, the frame having disk-shaped ends and pivoted in the latter, arms extending forward from said disk-shaped ends, a guard-bar connecting the ends of said arms, the A-shaped hounds connecting the rear of said disk-shaped ends, having an opening between the ends of the same and connected near the middle by a cross-bar, the tongue-bar clamped by a bolt between the ends of said hounds and having its forward end pivotally connected by a clip-iron or link with said cross-bar, the end of said tongue-bar being clamped between the two sections of said clip-iron, whereby said frame may be adjusted upon said tongue-bar by loosening the clamp-bolts of the latter and partially rotating said frame forward to adapt the machine for a low cut, and in the opposite direction for a high cut, substantially as set forth.

2. In a lawn-mower, the combination, with the tongue-bar, of the frame having the hounds with an opening in the middle, the clamp-bolt securing said tongue-bar therein, the clip-iron or link connected by a bolt with the end of said tongue-bar, and having its opposite end swiveled to a cross-bar of said hounds, whereby the machine is adapted to be adjusted to both a high and a low cut without disturbing the position of the tongue-bar by loosening the bolts in the latter and partially rotating said frame either forward or backward, as the case may be, for the purpose set forth.

3. In a lawn-mower, the combination of the ground-wheels, the frame pivoted in the latter and having the A-shaped hounds with an opening between the rear ends of the same, the tongue-bar clamped in said opening and having its front end connected by a horizontal bolt with a clip-iron or link, the front end of which is pivoted to a cross-bar of said hounds, whereby the machine is adapted to be adjusted by loosening the clamp-bolts connecting said tongue-bar with the hounds and clip-iron and partially rotating said frame without disturbing the position of the tongue-bar, as set forth.

4. In a lawn-mower, the combination, with the frame having the A-shaped hounds, of the tongue-bar, the clip-irons swiveled to the cross-bar of said hounds and secured to said tongue-bar by a bolt, with means for adjustment, as specified, for the purpose set forth.

5. In a lawn-mower, the disk-shaped end pieces, each provided with a hole within the periphery of the same, a lateral lug below the latter for attaching the cutter-bar outside of said disks within the cavity of the wheels, whereby the ends of said cutter-bar are protected and prevented from entangling the grass, and the means described for the adjustment of said cutter-bar, as set forth.

6. The combination, with the disk or end piece having the lateral lug on the outside of the same, of the radial rib connected therewith and cast integral with the same for the purpose of strengthening said lug, as set forth.

In testimony whereof I affix my signature in presence of two witnesses.

TIMOTHY ROGERS.

Witnesses:
　COLLIN FORD, Jr.,
　B. C. CONVERSE.